(No Model.) 2 Sheets—Sheet 1.
A. J. TAPLIN.
WHEEL.
No. 253,237. Patented Feb. 7, 1882.
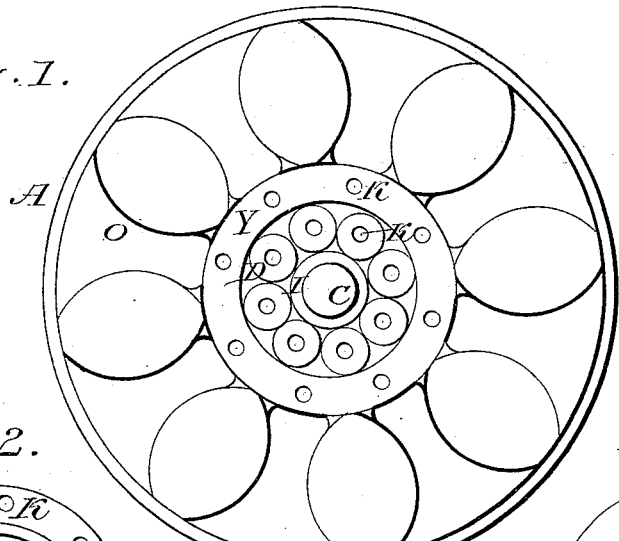
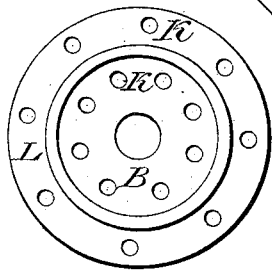
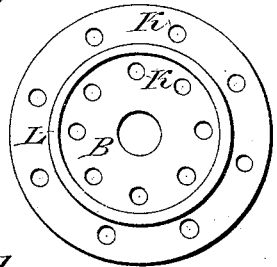
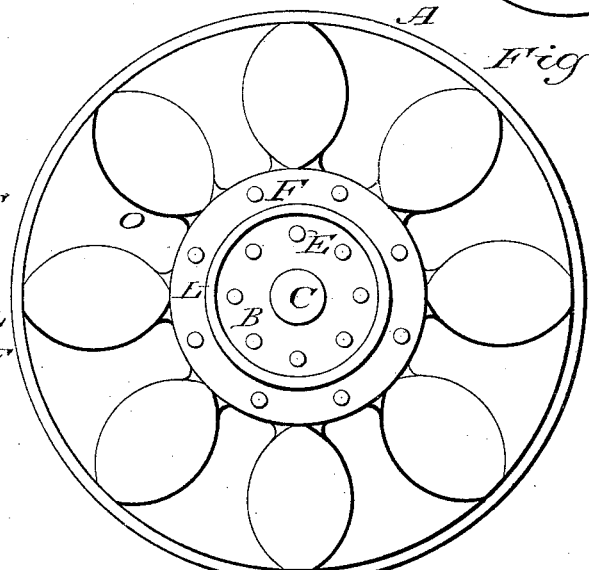
Witnesses:
David S Morse
Frank C Roundy
Inventor:
Albert J. Taplin,
N. PETERS, Photo-Lithographer, Washington, D. C.

(No Model.) 2 Sheets—Sheet 2.
A. J. TAPLIN.
WHEEL.
No. 253,237. Patented Feb. 7, 1882.
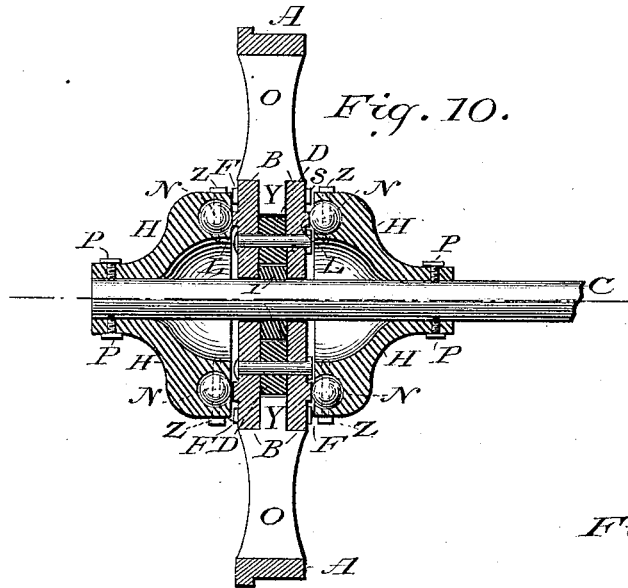
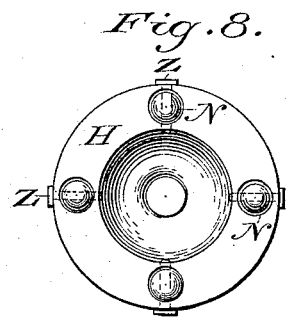
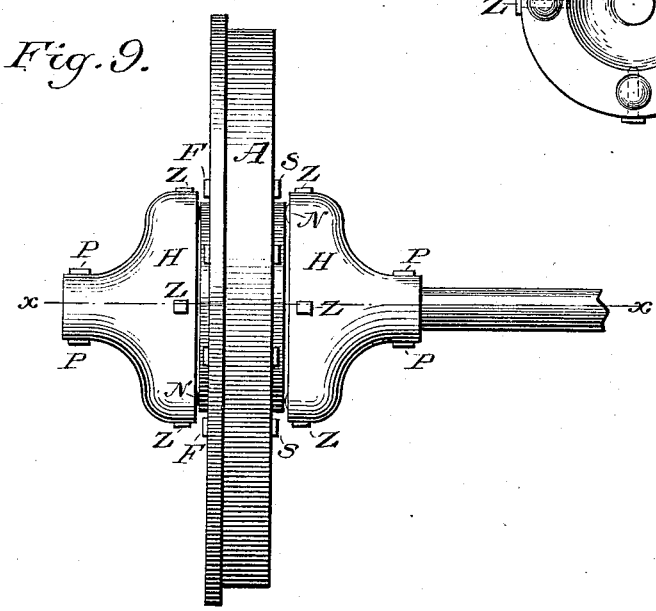
Witnesses:
David S Morse
Frank C. Roundy
Inventor:
Albert J. Taplin

UNITED STATES PATENT OFFICE.

ALBERT J. TAPLIN, OF CHICAGO, ILLINOIS.

WHEEL.

SPECIFICATION forming part of Letters Patent No. 253,237, dated February 7, 1882.

Application filed August 4, 1881. (No model.)

*To all whom it may concern:*

Be it known that I, ALBERT J. TAPLIN, of Chicago, in the county of Cook and State of Illinois, have invented new and useful Improvements in Wheels and Mode of Securing the Same on Axles or Shafts; and I do hereby declare that the following is a full, clear, and exact description thereof, reference being made to the letters of reference marked thereon, making a part of this specification.

The object of my invention has been to reduce friction in wheel-bearings and to insure in wheels safe and speedy operative facility without use of lubricating oils or grease, and, further, to secure practical operation of wheels with substantially reduced motive power, and therein combine economy and durability.

The nature of my invention consists in the construction and arrangement of anti-friction balls or rollers placed in manner encircling a ring placed on a shaft or axle, and on which a wheel operates, and said anti-friction balls or rollers being secured, as in manner placed, in and between cheek-plates by a circular system of bolts and nuts, and said bolts constituting the axles on which said anti-friction balls or rollers operate, and thereby the said anti-friction balls or rollers being in relative positions secure from all liability of becoming in any manner obstructed while in motion or clogged from the effects of dust, mud, or other injurious material, the cheek-plates in respective positions being therein permanently supported by step-bearings encircling the hub and being secured to the hub by a system of bolts and nuts, the said cheek-plates being provided with a circular step or projecting plane corresponding in diameter to center surfaces of a system of rotary balls or rollers respectively placed in adjustable frictionless wheel-blocks, and said adjustable frictionless wheel-blocks in respective positions being secured on axles or shafts by set-screws and in manner to sustain all lateral pressure occasioned by operation of the wheel. The wheel, as constructively set forth, being designed to operate independently on axles or shafts, thus avoids forcible adaptation to roadway-curves and street-angles, and, being in manner calculated to support any desirable weight, therefore may be constructively adapted to all purposes of common use, and by the following system of mechanism, herein illustrated, I attain my object as set forth and secure the benefits from the foregoing nature of my invention.

In order to enable others skilled in the art to which my invention appertains to make and use the same, I will now proceed to describe its construction and operation, referring to the annexed drawings, in which—

Figure 1 is a side elevation of a wheel with cheek-plates removed. Figs. 2 and 3 are similar and side elevations of cheek-plates. Figs. 4 and 5 are similar and longitudinal views of bolts with corresponding screw-nuts. Fig. 6 is a side elevation of a wheel with cheek-plates attached. Fig. 7 is an end elevation of a wheel with cheek-plates attached. Fig. 8 is a side and interior view of an adjustable frictionless wheel-block; and Fig. 9 is an end elevation of a wheel with cheek-plates attached and secured on a shaft or axle by adjustable frictionless wheel-blocks and set-screws, herein being shown the side and exterior view of Fig. 8, X X being a line through the points centering and axle C. Fig. 10 is a half-sectional and plan view through the line X X and as designated in Fig. 9.

Similar letters refer to similar parts throughout the several views.

In Fig. 1, A is the wheel; O, the spokes or radial arms, provided with step-bearings encircling a hub; Y, the hub; C, the axle or shaft, and K K a system of holes through the rollers D and hub Y, corresponding with similars in the cheek-plates, Figs. 2 and 3.

In Figs. 2 and 3, B is the cheek-plates, L a circular step or projecting plane, and K K a system of holes through the cheek-plates, corresponding with similars in the rollers D and hub Y.

In Figs. 4 and 5, E and F are similar bolts with respective and corresponding nuts, S S.

In Fig. 6 is shown a properly secured cheek-plate, and wherein is inserted through the similar holes, K K, a system of bolts, E and F, O being the spokes or radial arms whereon the cheek-plate B is supported.

In Fig. 7, A is the wheel, F the bolts and S the nuts that secure the cheek-plates, and L the circular step or projecting plane.

In Fig. 8, H is a side and interior view of the adjustable frictionless wheel-block, and wherein is inserted a system of spherical-formed rollers, N, secured respectively by bolts with screw-nuts Z.

In Fig. 9, A is the wheel, secured on a shaft or axle by adjustable frictionless wheel-blocks H and set-screws P, Z being the bolts and screw-nuts that secure the spherical-formed rollers N, which, by operation of the wheel, is caused to rotate on the circular step or projecting plane L.

In Fig. 10, A is the wheel; O, the spoke or radial arms; Y, the hub; D, the rollers that encircle the ring; I, the ring; C, the axle or shaft; B, the cheek-plates; L, the circular step or projecting plane; E, the bolts and S the nuts that secure the rollers D; F, the bolts and S the nuts that secure the cheek-plates B; H, the adjustable frictionless wheel-blocks; P, the set-screws, and Z the bolts with nuts that secure the rollers N.

I am aware that prior to my invention the indiscriminate use of rollers has prevailed for purposes of reducing power, as in the pulley-block, and for which reason I relinquish all claim to their origin; but in no instance have balls or rollers been combined in any practical form for use as herein set forth.

Having thus fully described my invention, what I claim as new, and desire to secure by Letters Patent, is—

1. The combination, in a wheel, of a spoke or radial arm, O, whereon is supported by step-bearing a cheek-plate, B, the cheek-plate B, the hub Y, and balls or rollers D, provided with holes K K and bolts E and F, with screw-nuts S S, substantially as and for the purpose set forth.

2. In combination with a shaft or axle, C, a ring, I, whereon encircling is arranged a system of balls or rollers, D, and whereon is placed a wheel with spokes or radial arms O, the hub Y, the cheek-plates B, and bolts E and F, with screw-nuts S S, substantially as and for the purpose set forth.

3. In combination with a shaft or axle, C, a wheel secured by adjustable frictionless wheel-blocks H, provided with set-screws P, the bolts and screw-nuts Z, and spherical-formed rollers N, designed to rotate on a circular step or projecting plane, L, substantially as and for the purpose set forth.

4. The combination of a wheel and wheel-block arranged on a shaft or axle, substantially as shown and described, and for the purpose herein specified.

In testimony that I claim the foregoing I have hereunto set my hand this 17th day of January, 1881.

ALBERT J. TAPLIN.

Witnesses:
 FRANK C. ROUNDY,
 WILLIAM A. LITTLE.